US011934390B2

(12) United States Patent
Tung et al.

(10) Patent No.: US 11,934,390 B2
(45) Date of Patent: Mar. 19, 2024

(54) APPROACHES FOR KNOWLEDGE GRAPH PRUNING BASED ON SAMPLING AND INFORMATION GAIN THEORY

(71) Applicant: Accenture Global Solutions Limited, Dublin (IE)

(72) Inventors: Teresa Sheausan Tung, San Jose, CA (US); Colin Anil Puri, San Jose, CA (US); Zhijie Wang, Fremont, CA (US)

(73) Assignee: Accenture Global Solutions Limited, Dublin (IE)

( * ) Notice: Subject to any disclaimer, the term of this patent is extended or adjusted under 35 U.S.C. 154(b) by 408 days.

(21) Appl. No.: 16/531,711

(22) Filed: Aug. 5, 2019

(65) Prior Publication Data

US 2020/0050605 A1 Feb. 13, 2020

Related U.S. Application Data

(63) Continuation of application No. 16/520,611, filed on Jul. 24, 2019, now Pat. No. 11,693,848.

(60) Provisional application No. 62/715,598, filed on Aug. 7, 2018.

(51) Int. Cl.
*G06F 16/242* (2019.01)
*G06F 16/23* (2019.01)
*G06F 16/901* (2019.01)

(52) U.S. Cl.
CPC ...... *G06F 16/2425* (2019.01); *G06F 16/2379* (2019.01); *G06F 16/9024* (2019.01)

(58) Field of Classification Search
CPC .................... G06F 16/2425; G06F 16/2379
See application file for complete search history.

(56) References Cited

U.S. PATENT DOCUMENTS

| 7,260,572 B2 | 8/2007 | Min et al. |
| 10,157,226 B1* | 12/2018 | Costabello .......... G06F 16/3325 |
| 10,296,524 B1* | 5/2019 | Tung .................... G06N 5/02 |
| 2014/0096249 A1* | 4/2014 | Dupont ................ G06F 21/552 |
| | | 726/23 |
| 2015/0127632 A1* | 5/2015 | Khaitan .............. G06F 16/9535 |
| | | 707/755 |
| 2015/0379414 A1* | 12/2015 | Yeh ..................... G06N 5/022 |
| | | 706/11 |
| 2016/0103867 A1 | 4/2016 | Ihad et al. |
| 2017/0068903 A1* | 3/2017 | Hakkani-Tur ......... G06N 20/00 |
| 2017/0169133 A1* | 6/2017 | Kim ................... G06F 16/9024 |
| 2017/0324759 A1 | 11/2017 | Puri et al. |
| 2018/0144257 A1* | 5/2018 | Ankisettipalli ....... G06F 40/237 |
| 2018/0218011 A1* | 8/2018 | Taycher ................ G06F 16/36 |

(Continued)

OTHER PUBLICATIONS

Gonzalez et al., "A Data-Driven Graph Schema," May 21-25, 2018 (Year: 2018).*

(Continued)

*Primary Examiner* — Yu Zhao
(74) *Attorney, Agent, or Firm* — Crowell & Moring LLP

(57) ABSTRACT

Knowledge graph systems are disclosed for implementing multiple approaches, including stand alone or combined approaches, for knowledge graph pruning. The approaches are based on graph sampling work such as, for example, information gain theory. The approaches are applied by a knowledge graph system to perform schema pruning, automatic graph pruning, and query correlation for improving query performance.

9 Claims, 3 Drawing Sheets

(56) References Cited

U.S. PATENT DOCUMENTS

2018/0341684 A1* 11/2018 Dechu .................. G06F 16/243
2019/0057297 A1* 2/2019 Barri ..................... G06N 5/003
2019/0065627 A1* 2/2019 De Mel ............... G06F 16/9038
2020/0050604 A1 2/2020 Tung et al.

OTHER PUBLICATIONS

Yang et al., "Mining Frequent Query Patterns from XML Queries", Proceedings of Eigth International Conference on Database Systems for Advanced Applications (DASFAA). Kyoto: IEEE, 2003.
Zhang et al., "Building XML Data Warehouse Based on Frequent Patterns in User Queries", Data Warehousing and Knowledge Discovery. Berlin, 2003, ISBN 978-3-540-40807-9. pp. 99-108.
Office Action in Australia Application No. 2019210614, dated Jan. 20, 2020, 7 pages.
Office Action in Australia Application No. 2019210614, dated Jun. 23, 2020, 6 pages.
Examination Report No. 1 for Australia Application No. 2021200046, dated Nov. 22, 2021, 3 pages.
Examination Report No. 2 for Australia Application No. 2021200046, dated Feb. 21, 2022, 3 pages.

* cited by examiner

APPROACHES FOR KNOWLEDGE GRAPH PRUNING BASED ON SAMPLING AND INFORMATION GAIN THEORY

CROSS-REFERENCE TO RELATED APPLICATION(S)

This application is a continuation of U.S. patent application Ser. No. 16/520,611, filed on Jul. 24, 2019, which claims benefit to U.S. Provisional Patent Application No. 62/715,598, filed Aug. 7, 2018, the entirety of all of which are incorporated by reference herein.

TECHNICAL FIELD

This disclosure relates to complex computer system architectures for implementing multiple approaches, including stand alone or combined approaches, for knowledge graph pruning. These approaches are technical solutions relating to the schema design, knowledge graph pruning, and database tuning of knowledge graphs. The disclosed knowledge graph systems improve overall performance during query analysis and data retrieval on knowledge graph datasets by returning query results more efficiently while also conserving computing resources.

BACKGROUND

Enterprise organizations may store their data in different data stores depending on one or more factors including data structure, volatility, volume, resource availability, or other measurable attributes. These data stores may be designed, managed, and operated by different units within an enterprise organization. It follows that such data stores in practice behave as data silos which are disparate, isolated, and make data less accessible across the units. More transparent, open, and robust data storage solutions are desired by enterprise organizations to more efficiently and effectively share and access their information across the organization.

In an effort to access and utilize their data, enterprises may allow queries to be run on their stored data to extract relevant information. So while maintaining a robust dataset of information may be desired, executing a query analysis over the entire dataset may exact a toll on computing resources as it is required to analyze information that is not necessarily pertinent to return results for the specific query.

DETAILED DESCRIPTION

Figure 1:
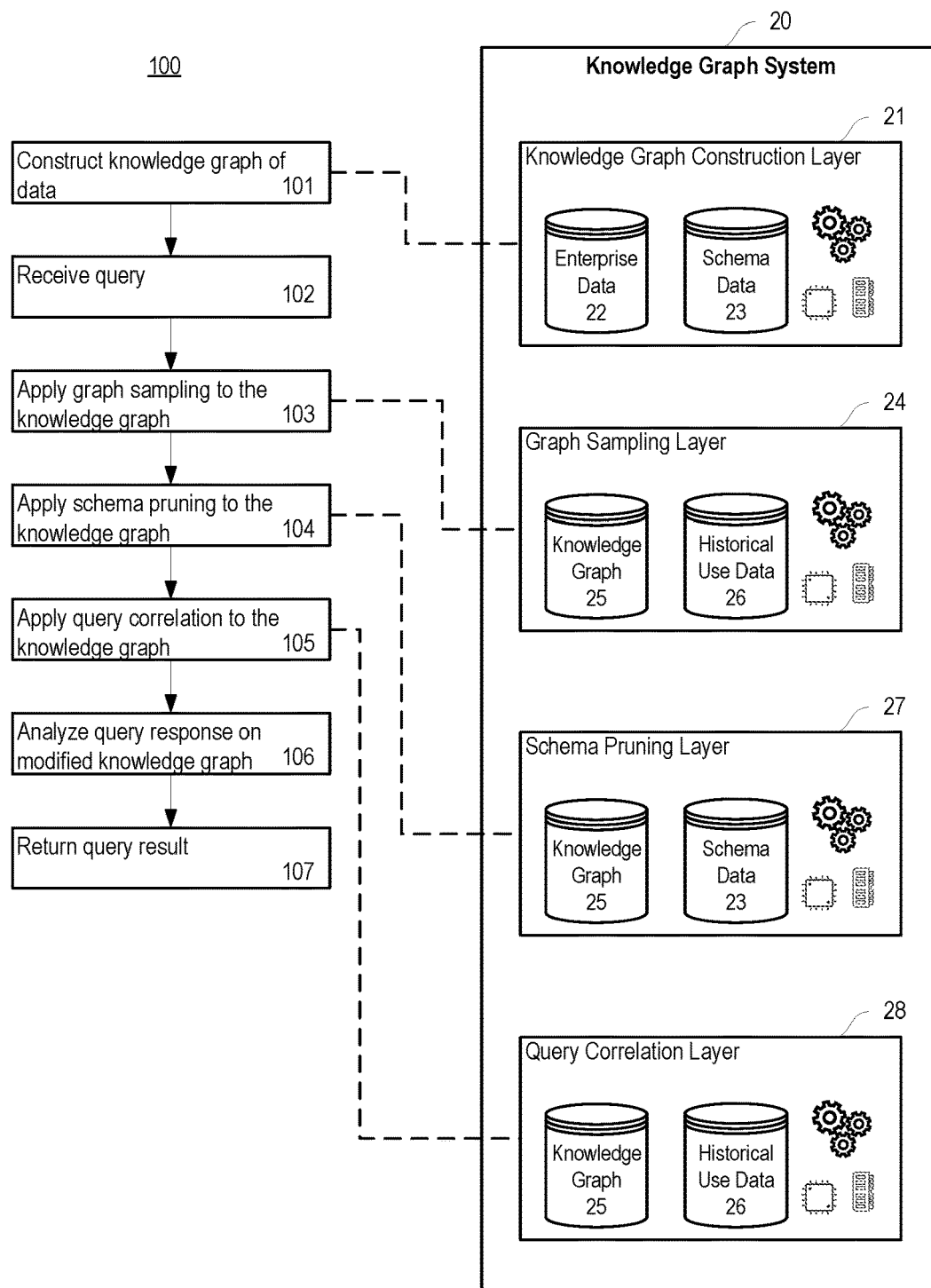
FIG. 1 shows an exemplary flowchart illustrating a knowledge graph modification process.

Organizing data into a dataset of knowledge graphs may provide improvements over more generic database storage offerings by providing an enriched data source for enterprises to build specific domain knowledge graphs. In utilizing the enriched structural benefits of a knowledge graph to store their data, enterprises have been incentivized to capture large amounts of data in preparation for potential analytical use cases. Maintaining such an enterprise level knowledge graph oftentimes requires a large commitment of computing resources, as the knowledge graph continues to grow and take in additional data. While maintaining large amounts of data knowledge may be an aspirational goal for any enterprise, this goal should be balanced against the known costs on resources to maintain the enterprise level knowledge graph. Furthermore, the additional data offered by the consideration of the entire domain knowledge graphs may only result in low information gain (context specific) when returning results to an information query.

A knowledge graph is a specific type of data format comprised of entity nodes of information and connecting edges that represent relationships between the information included in the entity nodes. To address specific technical problems, a knowledge graph is disclosed that offers an innovative data structure for storing relevant information for responding to a data query. The knowledge graph disclosed herein improves the quality of the knowledge graph dataset by reducing information stored on the knowledge graph that are determined not to be helpful to the query result analysis (i.e., data "pruning"). The pruning process removes irrelevant information from the knowledge graph when analyzing the query result. The improvements offered by the pruning process includes produces faster processing times and conservation of resources, as resources are not wasted in analyzing irrelevant information that are determined to offer little, to no, relevance to the query result.

Constructing a knowledge graph may include multiple steps. First, a graph schema definition may be obtained for the knowledge graph and refinement is applied as the knowledge graph is being generated. This defines the types of vertices and edges that are generated into the knowledge graph. Second, the knowledge graph may be hydrated with information by ingesting knowledge from multiple data sources and different knowledge extraction techniques (e.g., natural language processing (NLP), schema mapping, computer visions, or the like) to create the vertices and edges in the knowledge graph. As a third step, the knowledge graph may be pruned according to one or more of the pruning features described herein, to remove one or more entity nodes or edges from the knowledge graph. The pruning process may be applied in response to receiving a query. Each data source may create its own data processing pipeline for extracting data to include into the knowledge graph being constructed.

The present improved knowledge graph looks to reduce schema to more meaningful information based on detected usage of data by enterprise entities. For example, by tracking usage patterns by enterprise entities, knowledge graph systems may determine which schema elements are necessary for an end user enterprise entity, as well as those schema elements that are not.

The present improved knowledge graph further looks to understand the true importance of usage data based on actual usage. For example, by tracking usage patterns, knowledge graph systems may determine which actual instance data is most often returned, and in turn understand the ramifications of data persistence or data removal.

The present improved knowledge graph further looks to discover highly correlated search requests for query expansion and enrichment. For example, knowledge graph systems may measure the likelihood that a query may be the actual information of interest versus other information, execute the closely related traversal searches, and enrich results automatically.

Therefore the disclosed knowledge graph system provides a multi-pronged approach that includes applying a combination of one or more of the following: 1) graph pruning, 2) schema pruning, and/or 3) query correlation. To achieve faster computation for construction of knowledge graphs in response to a search query, a graph sampling approach is disclosed that helps speed up computation by sampling knowledge graphs to a smaller representative knowledge graph. A pruning approach is further disclosed that helps remove information from the knowledge graph with low information gain to reduce storage requirements and speed up graph traversal. With these features, technical improvements are realized by a computing device that constructs data into knowledge graphs and runs search queries on a pruned version of the knowledge graph, which results in the retrieval of more relevant and accurate information, in a shorter amount of time.

Improving the information gain is a feature provided by the knowledge graph system, where information gain is a main aspect used by a decision tree algorithm to construct a decision tree. It is the amount of information gained about a random variable or signal from observing another random variable (e.g., using decision trees and other fields to determine how important a feature is to the decision making process), and can be used to determine how important a piece of information is to a specific decision making process. The information gain calculation described herein may, for example, be related to a Kullback-Leibler divergence.

FIG. 1 shows a flowchart 100 describing an exemplary process for creating a knowledge graph dataset, and modifying the knowledge graph to prune off information based on a received query request. The processes attributed to the flowchart 100 may be implemented by a knowledge graph system 20, also shown in FIG. 1. The knowledge graph system 20 may be comprised of one or more layers, as shown in FIG. 1, where each layer may be comprised of software, hardware, middleware, frameworks, application programmer interface, and/or circuitry for implementing the corresponding features of the respective layer.

At 101, the knowledge graph system 20 constructs a knowledge graph 25 using data from an accessible dataset. The knowledge graph 25 is constructed by a knowledge graph construction layer 21, where the knowledge graph construction layer 21 accesses a database of enterprise data 22 and schema data 23 defining the parameters and rules for creating the knowledge graph. Generally, the knowledge graph includes a knowledge base of information structured in a graph presentation that captures entities (i.e., entity nodes, or nodes), relationships (i.e., edges), and attributes (i.e., node properties or edge properties) with semantic meaning. This graph data structure model offered by the knowledge graph provides the semantic meaning of the represented data, by modeling data according to a specified schema with an ontology and/or taxonomy. In this case, the knowledge base of information is obtained from the enterprise data 22, and the schema for constructing the knowledge graph 25 is obtained from the schema data 23.

Figure 3:
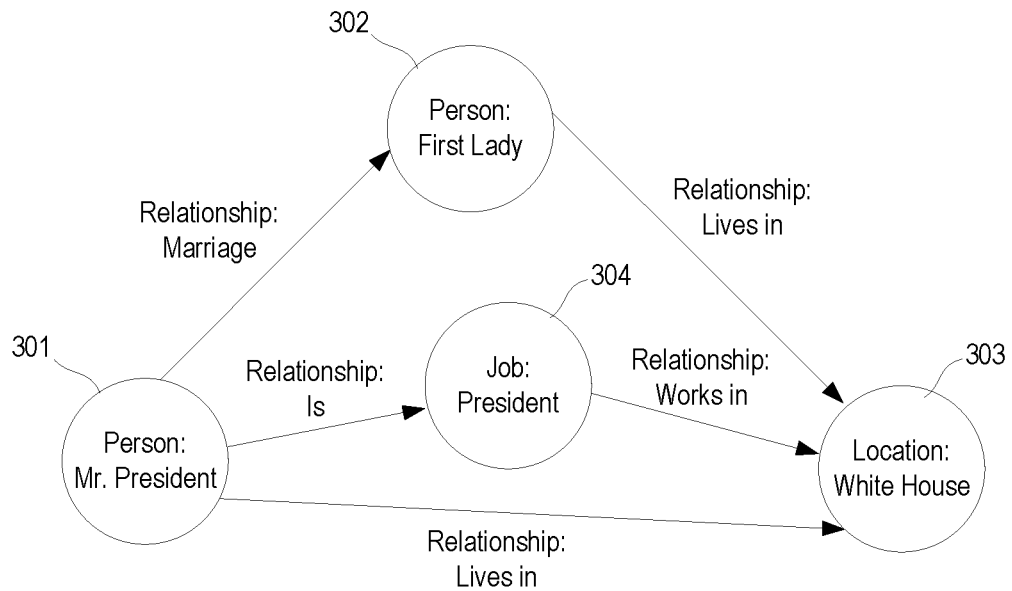
FIG. 3 shows an exemplary data tree structure.

FIG. 3 shows an exemplary knowledge graph 300, which may be referenced throughout this disclosure. The knowledge graph 300 includes a first entity 301 that identifies a person as "Mr. President", a second entity 302 that identifies a person as "First Lady", a third entity 303 that identifies a location as "White House", and a fourth entity 304 that identifies a job as "President". Between the entity nodes are relationship edges. For example, between the first entity 301 and the second entity 302 is an edge describing Mr. President is married to the First Lady. Between the second entity 302 and the third entity 303 is an edge describing the First Lady living in the White House. Between the first entity 301 and the third entity 303 is an edge describing Mr. President living in the White House. Between the first entity 301 and the fourth entity 304 is an edge describing Mr. President is in the job of being president. Between the fourth entity 304 and the third entity 303 is an edge describing the president working in the White House.

At 102, a query request is received by the knowledge graph system 20. The query may be input by a user, or generated automatically by the knowledge graph system 20, requesting information stored in the enterprise data 22. Referring to the information stored by the knowledge graph 300, the following may be some exemplary queries received by the knowledge graph system 20:

Query 1: Who is Mr. President and where does he live
Query 2: Who is Mr. President married to and where does she live
Query 4: Who is Mr. President married to
Query 4: who is Mr. President and what is his job At 103, a graph sampling layer 24 of the knowledge graph system 20 applies graph sampling to the knowledge graph 25. The graph sampling layer 24 may apply the graph sampling by pruning specific instances of information stored in the knowledge graph 25 based on an analysis of the instances historical usage over time. This historical usage information may be obtained from a database of historical use data 26. For example, the graph sampling may include analyzing the query patterns that people have historically used, and pruning the knowledge graph 25 based on what is learned from the historical usage information.

The graph sampling layer 24 may also continue pruning the knowledge graph 25 based on query statistics and attribute usage in an offline mode. The graph sampling layer 24 may also track search traversal paths along edges and assign probability of occurrence to the edges. Due to knowledge graph sizes becoming too large, the knowledge graph system 20 looks to leverage sampling with converge to represent a smaller, yet still similar, knowledge graph.

More specifically, the graph sampling layer 24 is configured to run a depth-first search (DFS), and keep the first n paths that are found from the search (where n is the sample size). The graph sampling layer 24 is further configured to consider the point where the $m^{th}$ path such that, where m>n, and keep the $m^{th}$ path with a probability n/m. Else, the graph sampling layer 24 will stop going down the DFS for that particular path. If the graph sampling layer 24 decides to keep the considered path, the graph sampling layer 24 replaces one of the n paths (uniformly at random) that is kept with this one. This randomized DFS procedure may further be defined as follows:

---

Randomized DFS(G, i, p)
   for k in Neighbors(G, i) do
     append k to path p
if pathCount ≤ s then
   if we reached the end of the walk then
     Put path p in buckers
   RandomizedDFS(G, k, p)
else
   with probability s/pathCount keep this path and remove
   one path chosen uniformly at random from our sample
   RandomizedDFS(G, k, p)

---

According to an exemplary graph sampling embodiment, if an entity node (or edge) in the knowledge graph 25 is found to be traversed in the path of the decision tree to obtain a query result, this may be interpreted as the entity node being useful in navigating the decision tree to arrive at the correct decision/answer to a query. So in this case, the entity node is found to be important/relevant and is assigned a high value for being included in the knowledge graph 25 and may be kept. Otherwise, if the entity node is found not to have been traversed in the path of the decision tree to obtain the query result, this may be interpreted as the entity node not being important/relevant for the particular query. As such non-relevant information may only serve to add confusion, the entity node may be removed from the knowledge graph 25 as part of the pruning process. So the knowledge graph pruning implemented by the graph sampling layer 24 identifies candidate entity nodes and/or candidate edges from the knowledge graph 25 that are found to have low value in a relevant area of study (e.g., in response to the received query).

As another exemplary instance of graph sampling, if the knowledge graph 25 is being used to track purchasing history for users that buy alcohol, users under the age of 21 should not be analyzed. So for a knowledge graph 25 that originally included users across all age groups, the nodes corresponding to users under the age of 21 may be identified as part of a candidate traversal path for pruning consideration off the knowledge graph 25 as part of the graph sampling process.

These candidate nodes and/or edges comprise a candidate traversal path. According to some embodiments, these candidate traversal paths from the knowledge graph 25 may be automatically removed when they fail to meet certain predetermined thresholds for relevance calculations. According to some embodiments, these candidate traversal paths may be flagged for manual inspection for removal. According to some embodiments, the candidate traversal paths may be further analyzed in view of other testing analysis (e.g., schema pruning). To provide additional context of the technical field and the graph sampling techniques disclosed herein, the contents of U.S. patent application Ser. No. 15/150,030, filed on May 9, 2016 (issued as U.S. Pat. No. 10,205,734), which is hereby incorporated by reference herein.

At 104, a schema pruning layer 27 of the knowledge graph system 20 may implement schema pruning on the knowledge graph 25. Schema pruning may include pruning the knowledge graph schema (e.g., schema data 23) based on information gained from associative mining. The schema pruning layer 27 may implement knowledge graph schema pruning to determine what types of entities, relationship, and/or properties to retain based on the historical usage statistics that are analyzed.

More specifically, the schema pruning layer 27 monitors queries received by the knowledge graph system 20 over time to determine what part of the knowledge graph schema is traversed. The schema pruning layer 27 also stores search traversal paths to determine which entity types appear most often in a query. Table 1 below shows exemplary query result traversal paths that may be taken through the knowledge graph 300 to reach a result to the exemplary queries 1-4 described above:

TABLE 1

| Query | Entity 1 | Relationship 1 | Entity 2 | Relationship 2 | Entity 3 |
| --- | --- | --- | --- | --- | --- |
| 1 | Person | Is | Job | Lives In | Location |
| 2 | Person | Marriage | Person | Lives In | Location |
| 3 | Person | Marriage | Person | | |
| 4 | Person | Is | Job | | |

Based on the entity traversal paths, the schema pruning layer 27 can mine the information to determine what portions of the schema are actually the most useful based on the historical usage patterns. The schema pruning layer 27 mines the information based on frequency of occurrence, and determines by co-occurrence of entities and relationships how much a user base may really need those schema elements or how important a schema element is to the entire knowledge graph 25. This information can then be fed back into the graph sampling algorithm of the graph sampling layer 24 to further refine which elements can be removed from not only the knowledge graph 25 but the corresponding schema as well, without affecting the integrity of the knowledge graph 25. The portions of the knowledge graph 25 that are considered by the schema pruning layer 27 may be the candidate traversal paths identified by the graph sampling layer 24.

Each of the graph sampling and schema pruning processes may be effective on their own, but together they can work to optimize the storage such that entities are removed only if the other supports its removal so that critical nodes may not be removed from any traversal path. So according to some embodiments, graph sampling may be applied as a first step to determine which traversal paths to put up for candidate removal. The subsequent schema pruning then calculates an information gain for keeping or removing the candidate traversal paths from that candidate list. According to some embodiments, candidate traversal paths for removal may be automatically removed when the candidate traversal paths and/or nodes are below a threshold information gain calculation for keeping. According to other embodiments, the final removal decision may be a manual process in case the information is actually highly valuable.

The information gain calculation is an indicator for how much a piece of information (e.g., knowledge graph entity/edge) can help to differential the dataset. Based on query statistics, the knowledge graph system stores the path traversal times as the metadata at the edge. For example:

If g.V(Mr. President).outE(lives), then that edge gets an count of +1. This is interpreted as, if the knowledge graph path that relates to "If Mr. President lives . . . in the White House" is traversed, this path is given a +1 count for information gain calculation. Traversing this path shows that the residence of the user is a relevant set of information in answering the query.

If g.V(Mr. President).until(_.hasLabel(location), outE( ).V( )), update all paths with count of +1. This is interpreted as, if Mr. President is located . . . in any location" is traversed, this path is given a +1 count for information gain calculation. Traversing this path shows that the residence of the user is a relevant set of information in answering the query.

So under the information gain calculation, the knowledge graph system 20 may analyze the knowledge graph 25 with query usage statistics. The knowledge graph 25 may be a sampled graph, to help make the computation more manageable. The knowledge graph system 20 can also apply inexact graph matching algorithms to detect for information or edges that are not often used by matching a known network with an unknown network.

Reverting back to the flowchart 100 at 105, a query correlation layer 28 may apply query correlation to the knowledge graph 25, which includes combing graph traversals with variations to a normalized format. The query correlation layer 28 may rely on the historical use data 26. If certain properties are found to be often retrieved together, the knowledge graph system may be configured to merge them together. If multiple version of a query are serving a same purposes, the knowledge graph system may be configured to let users know which one is the most efficient one.

So the applied query correlation may include query matching techniques by analyzing the query alone, and determine ways to improve the entities in the knowledge graph 25 by predicting how the entities are correlated. In terms of query matching, based on sampled traversal graph and query statistics (e.g., metadata), a traversal path edit distance can be calculated. The traversal path edit distance may include calculating a centrality score for each entity node in the traversal path, which calculates a centrality of the entity nodes as the relative distance of the entity node from a start and end of the traversal path the entity node is part of. The higher the centrality, the more important the node is predicted to be. The query correlation layer 28 may run a depth first search (DFS) to calculate the shortest path of traversal, and sum the weight/centrality of the entity nodes on this traversal path. The path with a highest score is determined to be the normalized query path.

So the centrality score is calculated for each node in a traversal path to represent a calculated importance of the respective node. The more important a node is considered to be, the more often it should occur in a traversal path. This way, the query correlation can surmise the importance of this type of traversal. If the shortest most traversed paths are found, then these path(s) are determined to be the quickest way to obtain the final answer to the query, which is correlates to the importance (i.e., the centrality score).

After applying a combination of one or more of the graph sampling, schema pruning, and/or query correlation to the knowledge graph 25, at 106 the knowledge graph system 20 runs the query on the modified (i.e., pruned) knowledge graph 25. A result to the query is then returned at 107.

The knowledge graph system 20 may operate under certain assumptions. The underlying assumption is that for a given target result, there are several different ways to write the query. If the most common query to achieve a certain level of result does not follow the shortest path (from schema level perspective), then the nodes in the longer path not yet in the shortest path provide additional semantic meaning to the end user—high information gain. If the most common query path to achieve a certain level of results is the shortest path, then nodes/relationship on the longer path provides very low information gain. The definition of most common and filtering criteria may be relaxed, and allow a certain degree of deviation from the shortest path, to satisfy most use cases.

Figure 2:
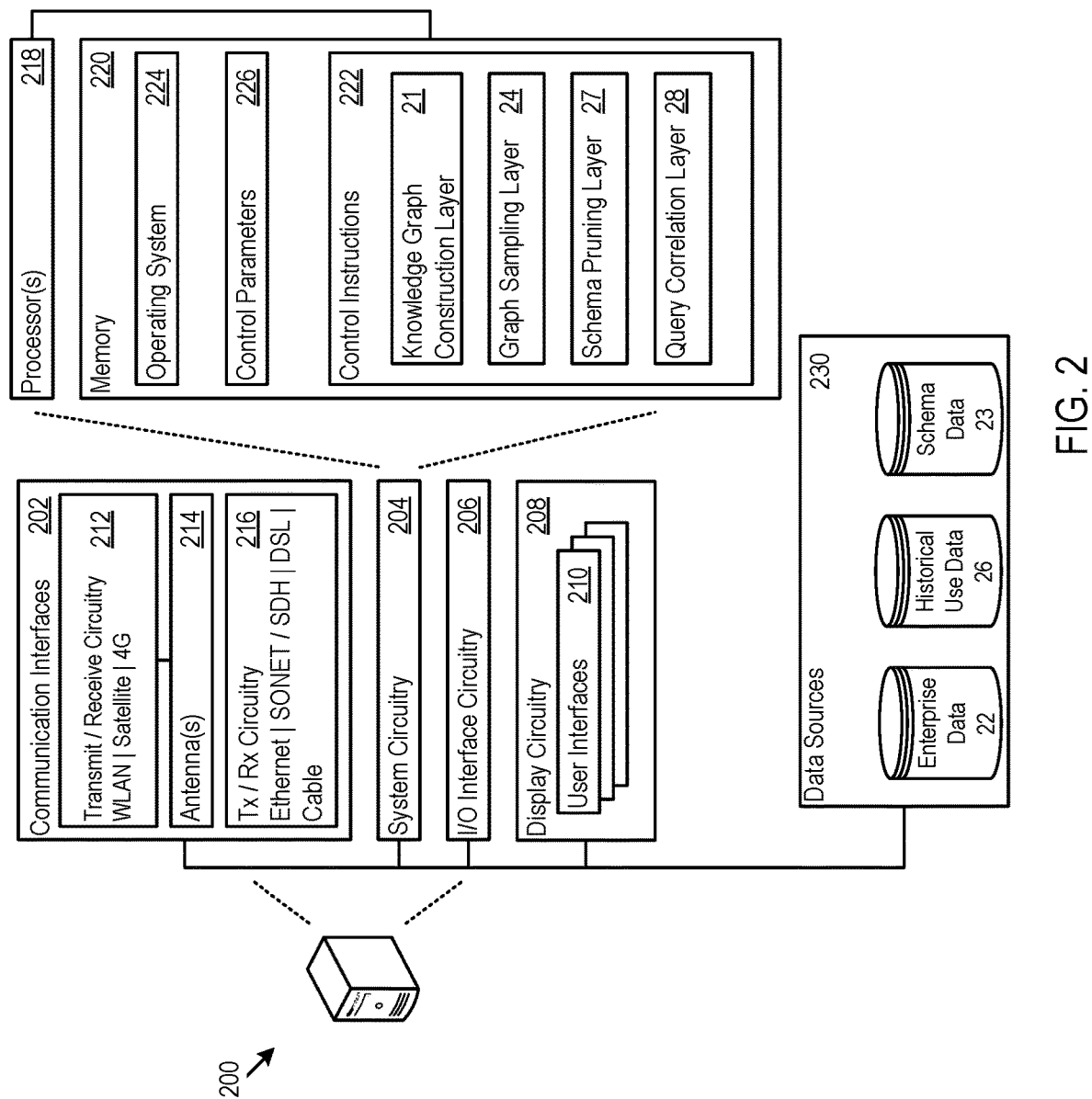
FIG. 2 shows an exemplary computer architecture for a computer device.

FIG. 2 illustrates an exemplary computer architecture of a computer device 200 on which the features of the knowledge graph system 20 may be executed. The computer device 200 includes communication interfaces 202, system circuitry 204, input/output (I/O) interface circuitry 206, and display circuitry 208. The graphical user interfaces (GUIs) 210 displayed by the display circuitry 208 may be representative of GUIs generated by the knowledge graph system 20 to receive query requests or present the query results to the enterprise application. The GUIs 210 may be displayed locally using the display circuitry 208, or for remote visualization, e.g., as HTML, JavaScript, audio, and video output for a web browser running on a local or remote machine. Among other interface features, the GUIs 210 may further render displays of the constructed knowledge graphs.

The GUIs 210 and the I/O interface circuitry 206 may include touch sensitive displays, voice or facial recognition inputs, buttons, switches, speakers and other user interface elements. Additional examples of the I/O interface circuitry 206 includes microphones, video and still image cameras, headset and microphone input/output jacks, Universal Serial Bus (USB) connectors, memory card slots, and other types of inputs. The I/O interface circuitry 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac, or other wireless protocols such as Bluetooth, Wi-Fi, WLAN, cellular (5G, 4G, LTE/A). The communication interfaces 202 may also include serial interfaces, such as universal serial bus (USB), serial ATA, IEEE 1394, lighting port, $I^2C$, slimBus, or other serial interfaces. The communication interfaces 202 may also include wireline transceivers 216 to support wired communication protocols. The wireline transceivers 216 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 204 may include any combination of hardware, software, firmware, or other circuitry. The system circuitry 204 may be implemented, for example, with one or more systems on a chip (SoC), application specific integrated circuits (ASIC), microprocessors, discrete analog and digital circuits, and other circuitry. The system circuitry 204 may implement any desired functionality of the knowledge graph system. As just one example, the system circuitry 204 may include one or more instruction processor 218 and memory 220.

The memory 220 stores, for example, control instructions 222 for executing the features of the knowledge graph system 20, as well as an operating system 224. In one implementation, the processor 218 executes the control instructions 222 and the operating system 224 to carry out any desired functionality for the knowledge graph system 20, including those attributed to the knowledge graph construction layer 21, graph sampling layer 24, the schema pruning layer 27, or the query correlation layer 28. The control parameters 226 provide and specify configuration and operating options for the control instructions 222, operating system 224, and other functionality of the computer device 200.

The computer device 200 may further include various data sources 230. Each of the databases that are included in the data sources 230 may be accessed by the knowledge graph system 20 to obtain data for consideration during any one or more of the processes described herein. For example, the data sources 230 may include the enterprise data 22, historical use data 26, and the schema data 23.

So the technical solutions provided by the knowledge graph system 20 relates to the assembling of one or more of the graph pruning, schema pruning, and query correlation. And unlike traditional information retrieval (e.g., like a traditional search engine), the knowledge graph system 20 relies on information gain calculations to better prune the knowledge graph based dataset. The returned query results generated by the knowledge graph system 20 may also be provided in a knowledge graph format generated in a similar manner.

Various implementations have been specifically described. However, other implementations that include a fewer, or greater, number of features for each of the apparatuses, methods, or other embodiments described herein are also possible.

What is claimed is:

1. A knowledge graph system comprising:
   memory for storing instructions; and
   a processor in communication with the memory, wherein the processor, when executing the instructions, is configured to:
   ingest and store a historical knowledge graph in a memory space by generating a set of entity nodes and edges of the historical knowledge graph from a plurality of data sources according to a historical knowledge graph schema, the historical knowledge graph schema being stored in the memory space and defining entity node types and edge types for creating the historical knowledge graph;
   receive a query request;
   execute by the processor a depth-first search of the historical knowledge graph in the memory space to identify a plurality of traversal paths in the historical knowledge graph according to historical query requests to form a sampled knowledge graph, the sampled knowledge graph being a subset of the historical knowledge graph;
   store numbers of times for traversal of edges of the plurality of traverse paths of the sampled knowledge graph, the numbers of times being extracted based on historical query requests, being generated as counter values, and being stored as metadata of the edges of the plurality of traverse paths of the sampled knowledge graph;
   retrieve the metadata of the edges of the plurality of traverse paths of the sampled knowledge graph including the counter values as quantified information gains of the edges of the plurality of traverse paths of the sampled knowledge graph;
   remove, from the sampled knowledge graph, one or more entity nodes or edges associated with at least one removal traversal path from the plurality of traversal paths having the quantified information gain lower than a predetermined information gain threshold;
   create a pruned knowledge graph in the memory space after removing the one or more entity nodes or edges associated with the at least one removal traversal path;
   remove a subset of entity node types and edge types corresponding to the entity nodes and edges of the at least one removal traversal paths from the historical knowledge graph schema;
   create a pruned knowledge graph schema from the historical knowledge graph schema after removing the subset of entity node types and edge types to replace the historical knowledge graph schema so as to reduce space occupied by the historical knowledge graph schema in the memory space; and
   execute the query by traversing the pruned knowledge graph in the reduced memory space in order to decrease traversal time for returning a query result.

2. The knowledge graph system of claim 1, wherein the processor, when executing the instructions, is further configured to:
   assign a relevance score to each of the at least one removal traversal path; and
   remove the one or more entity nodes or edges of from the at least one removal traversal path from the historical knowledge graph when their respective relevance scores are below a predetermined threshold relevance score.

3. The knowledge graph system of claim 1, the processor, is configured to further execute the instructions to perform an automatic correlation analysis to:
   compare the query request with the historical query requests having historical query patterns;
   determine traversal paths run on the historical knowledge graph for the historical query requests;
   calculate a centrality score for each entity node in the traversal paths;
   determine a traversal path including entity nodes having highest centrality scores; and
   include the traversal path in the sampled knowledge graph.

4. A knowledge graph pruning method in a knowledge graph system performed by a processor comprising:
   ingesting and storing a historical knowledge graph in a memory space by generating a set of entity nodes and edges of the historical knowledge graph from a plurality of data sources according to a historical knowledge graph schema, the historical knowledge graph schema being stored in the memory space and defining entity node types and edge types for creating the historical knowledge graph;
   receiving a query request;
   executing by the processor a depth-first search of the historical knowledge graph in the memory space to identify a plurality of traversal paths in the historical knowledge graph according to historical query requests to form a sampled knowledge graph, the sampled knowledge graph being a subset of the historical knowledge graph;
   storing numbers of times for traversal of edges of the plurality of traverse paths of the sampled knowledge graph, the numbers of times being extracted based on historical query requests, being generated as counter values, and being stored as metadata of the edges of the plurality of traverse paths of the sampled knowledge graph;
   retrieving the metadata of the edges of the plurality of traverse paths of the sampled knowledge graph including the counter values as quantified information gains of the edges of the plurality of traverse paths of the sampled knowledge graph;
   removing, from the sampled knowledge graph, one or more entity nodes or edges associated with at least one removal traversal path from the plurality of traversal paths having the quantified information gain lower than a predetermined information gain threshold;
   creating a pruned knowledge graph in the memory space after removing the one or more entity nodes or edges associated with the at least one removal traversal path;
   removing a subset of entity node types and edge types corresponding to the entity nodes and edges of the at least one removal traversal paths from the historical knowledge graph schema;
   creating a pruned knowledge graph schema from the historical knowledge graph schema after removing the subset of entity node types and edge types to replace the historical knowledge graph schema so as to reduce space occupied by the historical knowledge graph schema in the memory space; and
   executing the query by traversing the pruned knowledge graph in the reduced memory space in order to decrease traversal time for returning a query result.

5. The knowledge graph pruning method of claim 4, further comprising:
assigning a relevance score to each of the at least one removal traversal path; and
removing the one or more entity nodes or edges of from the at least one removal traversal path from the historical knowledge graph when their respective relevance scores are below a predetermined threshold relevance score.

6. The knowledge graph pruning method of claim 4, further configured to:
comparing the query request with the historical query requests having historical query patterns;
determining traversal paths run on the historical knowledge graph for the historical query requests;
calculating a centrality score for each entity node in the traversal paths;
determining a traversal path including entity nodes having highest centrality scores; and
including the traversal path in the sampled knowledge graph.

7. A computing device for implementing a knowledge graph system comprising:
a non-transitory machine-readable medium; and
instructions stored on the non-transitory machine-readable medium, the instructions configured to, when executed by processing circuitry, cause the processing circuitry to:
ingest and store a historical knowledge graph in a memory space by generating a set of entity nodes and edges of the historical knowledge graph from a plurality of data sources according to a historical knowledge graph schema, the historical knowledge graph schema being stored in the memory space and defining entity node types and edge types for creating the historical knowledge graph;
receive a query request;
execute by the processor a depth-first search of the historical knowledge graph in the memory space to identify a plurality of traversal paths in the historical knowledge graph according to historical query requests to form a sampled knowledge graph, the sampled knowledge graph being a subset of the historical knowledge graph;
store numbers of times for traversal of edges of the plurality of traverse path of the sampled knowledge graph, the numbers of times being extracted based on historical query requests, being generated as counter values, and being stored as metadata of the edges of the plurality of traverse paths of the sampled knowledge graph;
retrieve the metadata of the edges of the plurality of traverse paths of the sampled knowledge graph including the counter values as quantified information gain of the edges of the plurality of traverse path of the sampled knowledge graph;
remove, from the sampled knowledge graph, one or more entity nodes or edges associated with at least one removal traversal path from the plurality of traversal paths having the quantified information gain lower than a predetermined information gain threshold;
create a pruned knowledge graph in the memory space by after removing the one or more entity nodes or edges associated with the at least one removal traversal path;
remove a subset of entity node types and edge types corresponding to the entity nodes and edges of the at least one removal traversal paths from the historical knowledge graph schema;
create a pruned knowledge graph schema from the historical knowledge graph schema after removing the subset of entity node types and edge types to replace the historical knowledge graph schema so as to reduce space occupied by the historical knowledge graph schema in the memory space; and
execute the query by traversing the pruned knowledge graph in the reduced memory space in order to decrease traversal time for returning a query result.

8. The computing device of claim 7, wherein the instructions are further configured to, when executed by the processing circuitry, cause the processing circuitry to:
assign a relevance score to each of the at least one removal traversal path; and
remove the one or more entity nodes or edges of from the at least one removal traversal path from the historical knowledge graph when their respective relevance scores are below a predetermined threshold relevance score.

9. The computing device of claim 7, wherein the instructions are configured to, when executed by the processing circuitry, further cause the processing circuitry to:
compare the query request with the historical query requests having historical query patterns;
determine traversal paths run on the historical knowledge graph for the historical query requests;
calculate a centrality score for each entity node in the traversal paths;
determine a traversal path including entity nodes having highest centrality scores; and
include the traversal path in the sampled knowledge graph.

* * * * *